US008954098B2

(12) United States Patent
Kim et al.

(10) Patent No.: US 8,954,098 B2
(45) Date of Patent: Feb. 10, 2015

(54) SHORT MESSAGE PROCESSING METHOD AND APPARATUS WHICH PARSES AND LEXICALLY ANALYZES MEANINGFUL WORDS TO DETERMINE A CORRESPONDING SUPPLEMENTARY SERVICE

(75) Inventors: Gyu-baek Kim, Yongin-si (KR); Nam-geol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 11/649,762

(22) Filed: Jan. 5, 2007

(65) Prior Publication Data

US 2008/0004053 A1    Jan. 3, 2008

(30) Foreign Application Priority Data

Jun. 29, 2006    (KR) .................. 10-2006-0059583

(51) Int. Cl.
*H04W 4/00* (2009.01)
*H04L 12/58* (2006.01)

(52) U.S. Cl.
CPC .............. *H04L 12/585* (2013.01); *H04L 51/12* (2013.01); *H04L 12/5895* (2013.01)
USPC ....................... 455/466; 455/414.1

(58) Field of Classification Search
CPC .................... H04M 1/72552; H04M 1/72547; H04W 4/12; H04W 4/14; H04W 4/18; H04L 12/5895; H04L 51/38
USPC ............ 455/466, 412.1–414.4; 707/708, 771; 717/142–143

See application file for complete search history.

(56) References Cited

U.S. PATENT DOCUMENTS

| 5,794,142 | A | * | 8/1998 | Vanttila et al. | 455/419 |
| 5,966,652 | A | * | 10/1999 | Coad et al. | 455/412.1 |
| 6,125,281 | A | * | 9/2000 | Wells et al. | 455/466 |
| 6,292,668 | B1 | * | 9/2001 | Alanara et al. | 455/466 |
| 6,665,378 | B1 | | 12/2003 | Spielman et al. | |
| 6,813,507 | B1 | * | 11/2004 | Gress et al. | 455/466 |
| 7,146,381 | B1 | * | 12/2006 | Allen et al. | 707/104.1 |

(Continued)

FOREIGN PATENT DOCUMENTS

| CN | 1209936 A | 3/1993 |
| CN | 1362842 A | 8/2002 |
| EP | 1 618 734 A2 | 1/2006 |
| KR | 2004094249 A * | 11/2004 |
| KR | 2005-95248 | 9/2005 |
| KR | 2006-43970 | 5/2006 |
| KR | 2006-69943 | 6/2006 |
| WO | WO 0122680 A2 * | 3/2001 |
| WO | 2004/095422 A2 | 11/2004 |

OTHER PUBLICATIONS

Office Action issued in corresponding Korean Patent Application No. 2006-59583 dated Sep. 28, 2007.

*Primary Examiner* — George Eng
*Assistant Examiner* — Marcus Hammonds
(74) *Attorney, Agent, or Firm* — Jefferson IP Law, LLP

(57) ABSTRACT

A short message processing method and apparatus, which analyzes a short message received from a mobile communication network and provides via a packet data service node (PDSN) a supplementary service such as a credit card settlement details notifying service, a contact point registration service, a spam filtering service, a schedule registration service, a message history management service, and so forth, based on the result of the analysis. The short message processing method and apparatus can execute a supplementary service corresponding to the short message received through a PDSN, in corporation with a platform such as WIPI or BREW.

25 Claims, 4 Drawing Sheets

(56) References Cited

U.S. PATENT DOCUMENTS

| | | | |
|---|---|---|---|
| 7,346,341 B2 * | 3/2008 | Costa-Requena et al. | 455/414.3 |
| 7,835,504 B1 * | 11/2010 | Donald et al. | 379/88.11 |
| 2003/0083078 A1 * | 5/2003 | Allison et al. | 455/466 |
| 2004/0082348 A1 * | 4/2004 | Gabriel et al. | 455/466 |
| 2004/0242202 A1 * | 12/2004 | Torvinen | 455/412.1 |
| 2005/0048961 A1 * | 3/2005 | Ribaudo et al. | 455/419 |
| 2006/0105750 A1 * | 5/2006 | Zabawskyj et al. | 455/412.1 |
| 2006/0128364 A1 | 6/2006 | Requena et al. | |
| 2006/0234680 A1 * | 10/2006 | Doulton | 455/412.1 |
| 2007/0042710 A1 * | 2/2007 | Mahini et al. | 455/3.03 |

* cited by examiner

FIG. 4A

| SETTLEMENT DAY DESIGNATION | SETTLEMENT CONFIRMATION PROCESS | AMOUNT INQUIRY TO BE SETTLED |
|---|---|---|
| SETTLEMENT DAY<br>EVERY 5TH DAY ▼ | ...BC CARD...<br>March 20, 2006<br>APPROVED ₩10,000<br>...3/20 3:40 P<br>From:1588-0000 | [AMOUNT TO BE SETTLED ON THIS 5TH DAY]<br>ACCUMULATED AMOUNT TO BE SETTLED<br>TOTAL ₩210,000 |

FIG. 4B

PHONE NUMBER EXTRACTION

...CONTENT...
OXX-XXX-XXXX
...
...3/20 3:40 P
From:1588-0000

FIG. 4C

SCHEDULE INFORMATION EXTRACTION

...CONTENT...
SEE YOU TOMORROW
12 O'CLOCK
...
...3/20 3:40 P
From:1588-0000

SHORT MESSAGE PROCESSING METHOD AND APPARATUS WHICH PARSES AND LEXICALLY ANALYZES MEANINGFUL WORDS TO DETERMINE A CORRESPONDING SUPPLEMENTARY SERVICE

CROSS-REFERENCE TO RELATED APPLICATION

This application claims the benefit of Korean Patent Application No. 2006-59583, filed Jun. 29, 2006, in the Korean Intellectual Property Office, the disclosure of which is incorporated herein by reference.

BACKGROUND OF THE INVENTION

1. Field of the Invention

Aspects of the present invention relate to a short message processing method and apparatus. More particularly, aspects of the present invention relate to a short message processing method and apparatus that can analyze a short message received from a mobile communication network and provide via a packet data service node (PDSN) a supplementary service such as a credit card settlement details notifying service, a contact point registration service, a spam filtering service, a schedule registration service, a message history management service, and so forth, based on the result of analysis.

2. Description of the Related Art

In general, mobile communication service providers use different operating systems for their terminals and applications. Therefore, the systems and applications from different providers are not compatible with each other. To solve such problem, there has been provided a mobile terminal standard platform such as a Korean type Wireless Internet Platform for Interoperability (WIPI) or a Qualcomm type Binary Runtime Environment for Wireless (BREW). This makes it possible to independently access hardware so that various kinds of functions are provided to an interface for the application programming.

In the meantime, new services have been developed either by terminal manufacturers or by mobile communication service providers, since there is no standardized platform.

In the past, the platforms had been different for mobile communication service providers and terminal models. Because of such different platforms for mobile communication service providers and terminal models, the content providers or the mobile phone manufacturers had no choice but to separately develop the same application for each platform. In particular, even in the case of a short message service (SMS), all platforms had to be developed separately.

Moreover, the SMS basic service and application service thereof currently provided have been restricted to only a message transfer. Although the SMS service is utilized for other purpose (e.g., device control, information search, game, and so forth), the SMS service is basically nothing but a simple service of transferring a length-limited text based message. Therefore, the SMS related menus provided by terminals are in a simple state.

Furthermore, in the case of an SMS service, since a short messaging service center (SMSC), an SMS Gateway, a mobile originate (MO) server, and so forth, can be accessed only through mobile communication service providers having business alliances, there are limitations in developing and providing new services through other service providers.

SUMMARY OF THE INVENTION

Aspects of the present invention provide a short message processing method and apparatus that can analyze a short message received from a mobile communication network and provide via a packet data service node (PDSN) a supplementary service such as a credit card settlement details notifying service, a contact point registration service, a spam filtering service, a schedule registration service, a message history management service, and so forth, based on the result of analysis.

Additional aspects and/or advantages of the invention will be set forth in part in the description which follows and, in part, will be obvious from the description, or may be learned by practice of the invention.

According to an aspect of the present invention, there is provided a short message processing method, which includes parsing meaningful words in a short message received from a mobile communication network and lexically analyzing the words; determining a corresponding supplementary service based on the lexically analyzed words; confirming with the user whether to execute the corresponding supplementary service; and if the user confirms the execution, driving an application to execute the corresponding supplementary service.

According to another aspect of the present invention, after the driving of the application, the corresponding supplementary service based on the short message may be registered or deleted according to the user's selection.

According to another aspect of the present invention, in the lexically analyzing operation, the words may be parsed based on a token in the short message, using a compiler technology.

According to another aspect of the present invention, in the confirming operation, whether to execute the corresponding supplementary service may be provided to a user interface screen to be confirmed by the user's selection.

According to another aspect of the present invention, the corresponding supplementary service may be a spam filtering service for checking the existence of spam information in the short message and filtering the spam message from an originator.

According to another aspect of the present invention, the corresponding supplementary service may be a schedule information registration service for checking the existence of engaged schedule information in the short message and enabling the user to register the schedule information.

According to another aspect of the present invention, the corresponding supplementary service may be a credit card settlement details notifying service for checking in the short message the existence of contents notifying an upcoming payment of the credit card and notifying the user of the payment of the credit card.

According to another aspect of the present invention, the corresponding supplementary service may be an internet portal registration management service for managing the short message by confirming that the user has registered the short message in an internet portal server and allowing the user to manage the short message.

According to another aspect of the present invention, the corresponding supplementary service may be a contact point registration service for checking a phone number and a contact place in the short message and enabling the user to register the phone number and the contact place in a phone number directory.

According to another aspect of the present invention, the corresponding supplementary service and any result from using any of the supplementary services may be received from the same packet data communication network.

According to another aspect of the present invention, there is provided a short message processing apparatus which includes a lexical analyzer for parsing meaningful words in a short message received from a mobile communication network and lexically analyzing the words; a controller for determining a corresponding supplementary service to be provided via the short message, based on the short message lexically analyzed, confirming whether to execute the corresponding supplementary service according to a user's selection, and controlling the execution of the corresponding supplementary service; and a dispatcher for driving an application to execute the corresponding supplementary service.

According to another aspect of the present invention, the short message processing apparatus may further include a service manager for registering or deleting the corresponding supplementary service based on the short message according to the user's selection after the driving of the application.

According to another aspect of the present invention, the short message processing apparatus may further include a user interface for confirming a user whether to execute the corresponding supplementary service.

According to another aspect of the present invention, the lexical analyzer may parse based on a token in the short message, using a compiler technology.

According to another aspect of the present invention, the controller may include a user interface screen for executing the corresponding supplementary service which is confirmed according to the user's selection.

According to another aspect of the present invention, the corresponding supplementary service may be a spam filtering service for checking the spam information in the short message and filtering the spam message from an originator.

According to another aspect of the present invention, the corresponding supplementary service may be a schedule information registration service for checking the engaged schedule information in the short message and enabling the user to register the schedule information.

According to another aspect of the present invention, the corresponding supplementary service may be a credit card settlement details notifying service for checking in the short message the contents notifying the payment of the credit card to be paid and notifying the user of it.

According to another aspect of the present invention, the corresponding supplementary service may be an internet portal registration management service for managing the short message through confirming the user whether to register the short message in an internet portal server and to manage it.

According to another aspect of the present invention, the corresponding supplementary service may be a contact point registration service for checking a phone number and a contact place in the short message and enabling the user to register the same in a phone number directory.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4A is a view illustrating an exemplary screen showing a credit card settlement details notifying service through a short message;

FIG. 4B is a view illustrating a screen extracting a phone number from the contents of the short message according to an embodiment of the present invention; and FIG. 4C is a view illustrating a screen extracting the schedule information from the contents of the short message according to an embodiment of the present invention.

DETAILED DESCRIPTION OF THE EMBODIMENTS

Figure 1:
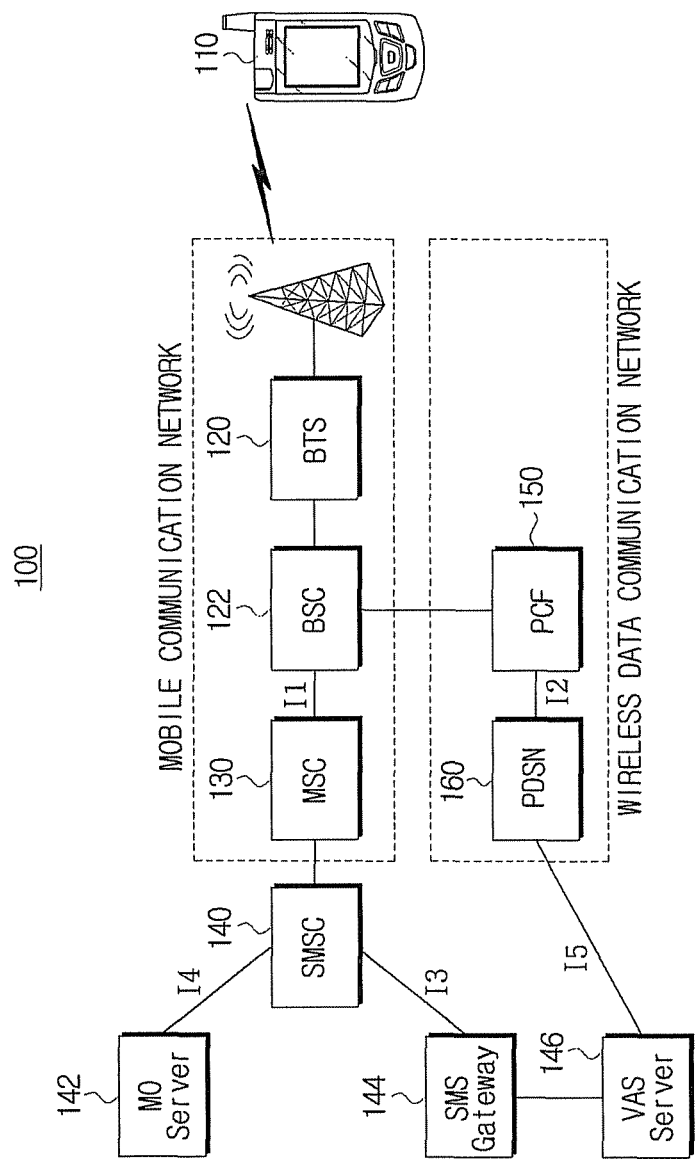
FIG. 1 is a block diagram schematically illustrating the construction of a mobile communication system to which a short message processing method according to an embodiment of the present invention is adapted.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram schematically illustrating the construction of a mobile communication system to which a short message processing method according to an embodiment of the present invention is adapted.

The mobile communication system 100 according to an embodiment of the present invention includes a mobile terminal 110, a base transceiver subsystem (BTS) 120, a base station controller (BSC) 122, a mobile switching center (MSC) 130, a short message service (SMS) center 140, a mobile originate (MO) server 142, an SMS gateway 144, a value-added service (VAS) server 146, a packet control function unit (PCF) 150, and a packet data service node (PDSN) 160.

The mobile terminal 110 receives an SMS related service from a mobile communication network as well as performs a wireless call via the mobile communication network.

The BTS 120 executes the transmission/reception of a wireless signal for the mobile terminal 110 and the conversion and the encryption/decryption of communication protocols, and the BSC 122 performs a function such as an allocation control of the communication channel for the mobile terminal 110, managing the plurality of BTS 120.

The MSC 130 processes a call request requested by the BTS 120 via the BSC 122.

The SMS center 140 executes a service that sends a transfer message to a recipient's side while switching the transfer message into an SMS message according to a request for an SMS message from the mobile terminal 110, or otherwise sends a recipient's side transfer message to the mobile terminal 110 while switching it into an SMS message.

The MO server 142 immediately sends a response SMS message to a user who participates in a quiz or an event of the broadcasting program on the air, using an SMS message.

The SMS gateway 144 sends to the SMS center 140 an SMS message from the VAS server 146.

The VAS server 146 is a value added service server whose dialing control is logically connected in an end terminal and a service of which is limited to a terminal.

The PCF 150 processes packet data in corporation with the PDSN 160.

The PDSN 160 serves as an interface function between a radio access network (RAN) and a data core network. That is, it terminates a data link layer from the mobile terminal 110 and routes to an upper layer protocol on the data network.

Figure 2:
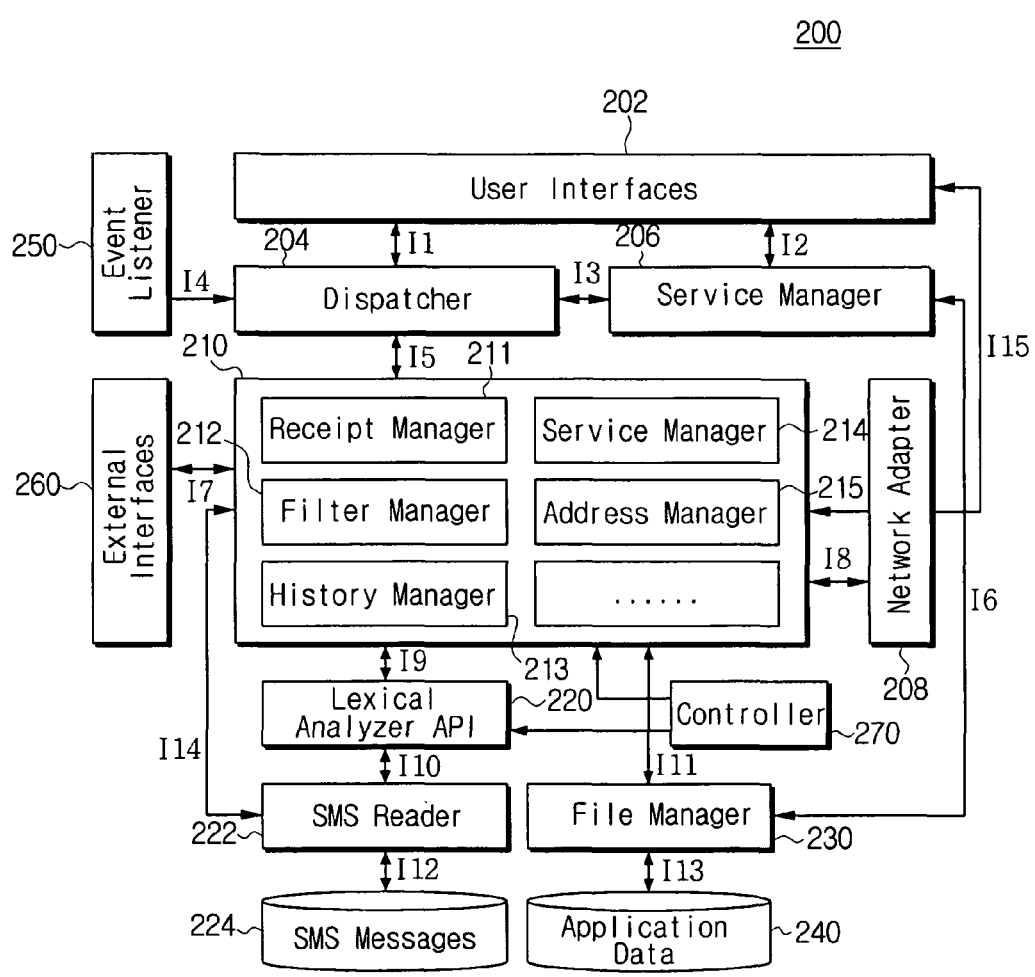
FIG. 2 is a block diagram illustrating the internal construction of a mobile terminal as a short message processing apparatus according to an embodiment of the present invention.

FIG. 2 is a block diagram illustrating the internal construction of a mobile terminal as a short message processing apparatus according to an embodiment of the present invention.

The mobile terminal 200 according to an embodiment of the present invention includes a user interface 202, a dispatcher 204, a service manager 206, a network adapter 208, a supplementary service 210, a lexical analyzer (API) 220, an SMS reader 222, an SMS message 224, a file manager 230, an application data 240, an event listener 250, an external interface 260, and a controller 270.

The supplementary service 210 includes a receipt manager 211, a filter manager 212, a history manager 213, a service manager 214, and an address manager 215.

The user interface 202 includes a screen through which the user checks whether to execute a supplementary service corresponding to a short message received and to input the user's selection.

The dispatcher 204 drives an application executing a supplementary service corresponding to the short message received. Also, the dispatcher 204 executes the supplementary service in the form of Plug & Play.

The service manager 206 registers or deletes the corresponding supplementary service based on the short message according to the user's selection after driving the application executing the supplementary service.

The network adapter 208 provides communication in type of TCP/IP or HTTP required for the supplementary service, using the PDSN.

The supplementary service 210 manages the provision of the corresponding supplementary service based on the received short message.

The lexical analyzer 220 lexically analyzes the meaningful words in the short message received from the mobile communication network while parsing them. Also, the lexical analyzer 220 parses them based on a token in the short message using a compiler technology.

The SMS reader 222 reads a short message from the SMS messages 224.

The SMS message 224 stores the received short message.

The file manager 230 manages the storage, the deletion, the loading and so forth of the application data stored in the application data 240 in the form of file.

The application data 240 stores in the form of file the application data for executing the respective supplementary services.

The event listener 250 informs of an event such as the reception of the short message.

The external interface 260 operates in cooperation with the existing functions provided by the terminal. For example, it operates in corporation with the exiting phone number management or schedule management.

The controller 270 determines the corresponding supplementary service to be provided through a short message based on the analyzed result from the lexical analyzer 220, inquires the user whether to execute the corresponding supplementary service, and controls the execution of the corresponding supplementary service.

Also, the controller 270 executes the corresponding supplementary service according to the user's selection, which is input through the user interface screen.

Figure 3:
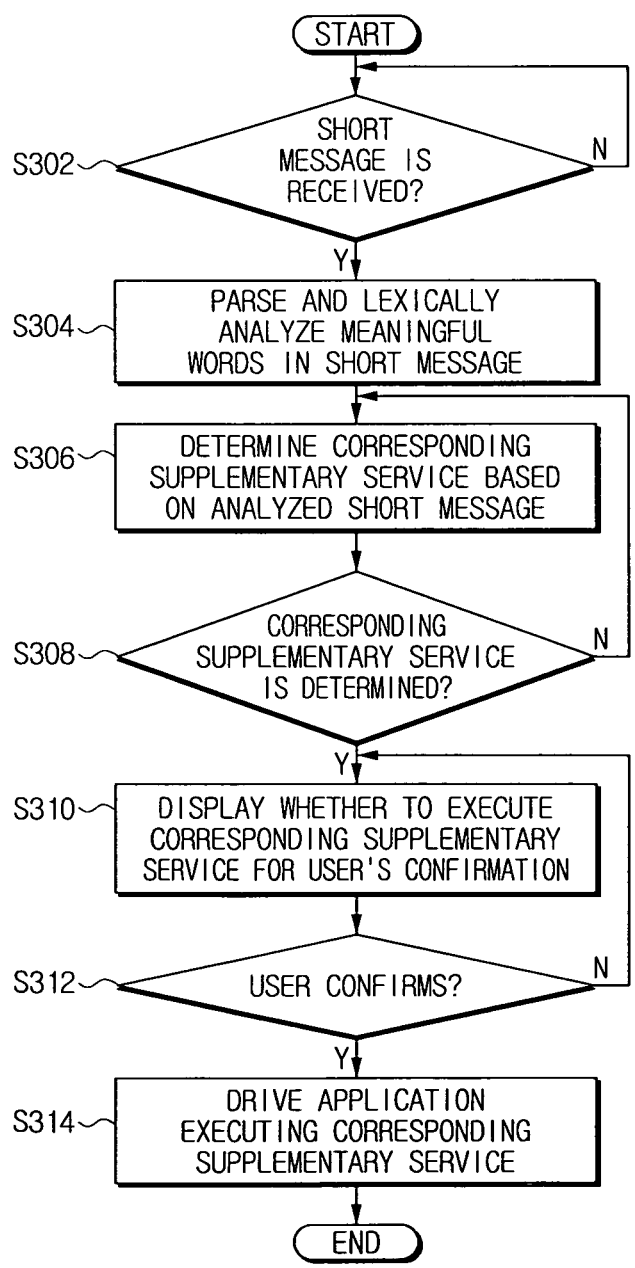
FIG. 3 is an operational flow chart explaining the short message processing method according to an embodiment of the present invention.

FIG. 3 is an operational flow chart explaining the short message processing method according to an embodiment of the present invention.

First, an aspect of the present invention operates in cooperation with a mobile standard platform such as Wireless Internet Platform for Interoperability (WIPI) or a Qualcomm type Binary Runtime Environment for Wireless (BREW). In such platform a handset adaptation layer (HAL), on which a run-time engine is placed. Further, according to another aspect of the present invention there is provided an API which provides access to the plurality of functions.

The mobile terminal 200 according to an aspect of the invention receives a short message from a mobile communication network in operation (S302).

While the exiting SMS message and the supplementary services of the SMS message are provided via a route I1 of FIG. 1 through SMS center 140, the supplementary services of the SMS service of the invention are provided via a route I2 of FIG. 1 through PDSN 160.

In the mobile terminal 200, when the short message is received, the controller 270 stores the short message in the SMS message 224.

Then, the controller 270 reads the received short message from the SMS messages 224 through the SMS reader 222 and sends the short message to the lexical analyzer 220.

The controller 270 parses and lexically analyzes the meaningful words in the short message through the lexical analyzer 220 in operation (S304). Herein, the lexical analyzing represents the parsing based on the token in the short message using a compiler technology. That is, it analyzes that the meaningful word candidates (token) in the short message are the information on for example, date, time, or phone number.

As a result of lexical analysis, if the meaningful words exist in the contents of the short message, the controller 270 then determines which supplementary services match the words at operation (S306).

For instance, as a result of the lexical analysis, if there exist in the contents of the short message the words related to the credit card, the controller 270 determines them as a credit card settlement details notifying service for inquiring the credit card settlement or the amount to be settled.

Herein, the corresponding supplementary service may be a spam filtering service for checking the existence of spam information in the short message to filter a spam message from an originator.

The corresponding supplementary service may be a schedule information registration service for checking the existence of engaged schedule information in the short message and enabling the user to register the schedule information.

The corresponding supplementary service may be a credit card settlement details notifying service for checking in the short message the existence of contents notifying of an upcoming payment of the credit card and notifying the user of payment of the credit card.

The corresponding supplementary service may be an internet portal registration management service for managing the short message through inquiring the user whether to register the short message in an internet portal server and to manage it.

The corresponding supplementary service may be a contact point registration service for checking a phone number and a contact place in the short message and enabling the user to register the same in a phone number directory.

When determining the supplementary service corresponding to the received short message at operation (S308), the controller 270 displays to the user interface 202 the screen for checking the user whether to execute the corresponding supplementary service at operation (S310).

The user confirms through the screen whether to execute the corresponding supplementary service by inputting the selection of the execution of the corresponding supplementary service through the user interface 202 at operation (S312).

When the user confirms the execution of the corresponding supplementary service, the controller 270 drives through the dispatcher 204 an application executing the corresponding supplementary service at operation (S314). At this time, the controller 270 executes the respective corresponding supplementary services, using the PDSN 160 via the network adapter 208.

For instance, if the corresponding supplementary service according to the user's selection is the credit card settlement details notifying service, the controller 270 calls the reception manager 211 via a route I5. The controller 270 then reads the information on a settlement day, an accumulated settled amount and so forth via the routes I11 and I13. The controller 270 then analyzes through the lexical analyzer 220 the credit card settlement information in the contents of the short message received via the routes I9, I10, and I12. As a result of analysis, the controller 270 determines if the credit card settlement information using words, such as an originator's number (specified card company number), a specified name of a card company, a date, an amount of payment, approved/denied, and so forth, in the tokens of the short message. When the application executing the credit card settlement details notifying service is driven, as illustrated in FIG. 4A, the controller 270 provides on the screen the total amount obtained by adding a newly spent amount to the present amount accumulated up to the settlement day. Moreover, the controller 270 displays on the screen a confirmation message for checking the user's confirmation while providing "a settlement day designation," "a settlement confirmation message process," "an inquiry for the amount to be settled," or others to the user interface 202 via a route I15. When receiving the user's confirmation, the controller 270 stores the result information via the routes I11 and I13.

If the corresponding supplementary service according to the user's selection is the contact point registration service, the controller 270 calls the address manager 215 via a route I5. The controller 270 extracts and analyzes the contact point information in the contents of the short message via the routes I9, I10, and I12, as illustrated in FIG. 4B. The controller 270 determines whether, among the tokens transmitted from the lexical analyzer 220, there is the information that can be considered as the contact point information that starts with "01X" or an area code system such as "02", "031" and so forth, and has the form of "XXXX XXXX XXXX" or "XXX-XXXX-XXXX". The controller 270 then displays to the user interface 202 a confirmation message via the route I15 and receives the user's confirmation. Then, the controller 270 registers the contact point in a phone number directory service provided in the terminal via the route I7.

If the corresponding supplementary service according to the user's selection is the spam filtering service, the controller 270 calls the filter manager 212 via the route I5. Then, the controller 270 analyzes the spam type information in the contents of the short message via the routes I9, I10, and I12. The controller 270 then determines whether, among the tokens transmitted from the lexical analyzer 220, there is the information that can be considered as the contact point information that starts with "060" and has the form of "XXXX XXXX XXXX" or "XXX-XXXX-XXXX". The controller 270 then displays to the user interface 202 a confirmation message via the route I15 and receives the user's confirmation. Then, the controller 270 deletes the corresponding short message from the SMS message 224 via the route I7.

If the corresponding supplementary service according to the user's selection is the schedule information registration service, the controller 270 calls the schedule manager 214 via the route I5. Then, the controller 270 extracts and analyzes the schedule information such as engagement in the contents of the short message via the routes I9, I10, and I12 as illustrated in FIG. 4C. The controller 270 then determines whether among the tokens transmitted from the lexical analyzer 220, there is the information that can be considered as the schedule information through the checking of the existence of the information such as tomorrow, today, year/month/day/hour/minute, and so forth. The controller 270 then displays on the user interface 202 a confirmation message via the route I15 and receives the user's confirmation. Then, the controller 270 registers the schedule in the schedule management service provided in the terminal via the route I7.

If the corresponding supplementary service according to the user's selection is the internet portal registration management service, the controller 270 calls the history manager 213 via the route I5. Then, the controller 270 reads the short message stored in the SMS message 224 via the route I14. The controller 270 then displays on the user interface 202 a list of the short messages via the route I15, and receives the user's confirmation for the list to be stored. Then, the controller 270 registers the contents in the internet portal server via the route I8. At this time, the registration is carried out using a type of TCP/IP or HTTP.

Then, the controller 270 sends in the manner of TCP/IP or HTTP the result of the provision of the respective corresponding supplementary services through the network adapter 208.

In the mean time, after driving the application executing the corresponding supplementary service, the controller 270 may register or delete the corresponding supplementary service based on the short message through the service manager 206 according to the user's selection.

As set forth before, according to an embodiment of the present invention, there is provided a short message processing method and apparatus that can analyze a short message received from a mobile communication network, provide through a PDSN a supplementary service, such as a credit card settlement details notifying service, a contact point registration service, a spam filtering service, a schedule registration service, a message history management service, and so forth, based on the analyzed result, and sends the result of the supplementary service through a packet data network.

The protection range of an aspect of the present invention should be interpreted through the claims annexed hereafter and all technical spirits equivalent thereto should be interpreted to be included in the scope of the rights of the present invention.

As described above, the method and apparatus according to the exemplary embodiments of the present invention can receive a short message from a mobile communication network, and perform a supplementary service corresponding to the short message received through a PDSN, in cooperation with a platform such as WIPI or BREW.

Additionally, extended services can be provided, such as intelligence SMS, or provision of mobile contents-related service in association with the Internet portal service.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A short message processing method comprising:
parsing at least one meaningful word in a short message received from a mobile communication network and lexically analyzing the at least one meaningful word;
determining a type of the lexically analyzed at least one meaningful word from among a plurality of types and identifying a plurality of supplementary services corresponding to the type of the lexically analyzed at least one meaningful word;

receiving an input to select one of the plurality of supplementary services from a user; and executing the selected supplementary service, wherein the lexically analyzed at least one meaningful word is at least one of a plurality of different types of meaningful words, wherein each meaningful word of the plurality of types corresponds to a different supplementary service, and wherein the plurality of supplementary services include a schedule information registration service checking the existence of engaged schedule information in the short message and enabling the user to register the schedule information and a credit card settlement details notifying service checking in the short message the existence of contents notifying of an upcoming payment of a credit card and notifying a user of a payment of the credit card.

2. The method of claim 1, further comprising, after the executing, registering or deleting the selected supplementary service based on the short message according to the user's selection.

3. The method of claim 1, wherein the lexically analyzing of the meaningful words includes parsing the meaningful words based on a token in the short message, using a compiler technology.

4. The method of claim 1, wherein the receiving of the input to select one of the plurality of supplementary services is performed through a user interface screen in which a user enters the user's selection.

5. The method of claim 1, wherein the plurality of supplementary services include a spam filtering service checking the existence of spam information in the short message and filtering the spam message from an originator.

6. The method of claim 1, wherein the plurality of supplementary services include an internet portal registration management service managing the short message by confirming whether the user registered the short message in an internet portal server.

7. The method of claim 1, wherein the plurality of supplementary services include a contact point registration service checking a phone number and a contact place in the short message and enabling the user to register the phone number and the contact place in a phone number directory.

8. The method of claim 1, wherein the selected supplementary service and any result resulting from the selected supplementary service are received from a same packet data communication network.

9. A short message processing apparatus comprising:

a lexical analyzer for parsing at least one meaningful word in a short message received from a mobile communication network and for lexically analyzing the at least one meaningful word;

a controller for determining a type of the lexically analyzed at least one meaningful word from among a plurality of types and identifying a plurality of supplementary services to be provided via the short message corresponding to the type of the lexically analyzed at least one meaningful word, for receiving an input to select one of the plurality of supplementary services from a user, and for controlling the execution of the selected supplementary service; and a dispatcher for executing the selected supplementary service, wherein the lexically analyzed at least one meaningful word is at least one of a plurality of different types of meaningful words, wherein each meaningful word of the plurality of types corresponds to a different supplementary service, and wherein the plurality of supplementary services include a schedule information registration service checking the existence of engaged schedule information in the short message and enabling the user to register the schedule information and a credit card settlement details notifying service checking in the short message contents notifying of an upcoming payment of the credit card and notifying the user of the payment of the credit card.

10. The apparatus of claim 9, further comprising a service manager for registering or deleting the selected supplementary service corresponding to the short message according to the user's selection after the executing of the selected supplementary service.

11. The apparatus of claim 9, further comprising a user interface for confirming whether to execute the selected supplementary service according to the user's selection.

12. The apparatus of claim 9, wherein the lexical analyzer parses based on a token in the short message, using a compiler technology.

13. The apparatus of claim 9, wherein the controller includes a user interface screen to enter the user's selection in order to execute the selected supplementary service.

14. The apparatus of claim 9, wherein the plurality of supplementary services include a spam filtering service checking spam information in the short message and filtering a spam message from an originator.

15. The apparatus of claim 9, wherein the plurality of supplementary services include an internet portal registration management service managing the short message by confirming the user registered the short message in an internet portal server.

16. The apparatus of claim 9, wherein the plurality of supplementary services include a contact point registration service checking a phone number and a contact place in the short message and enabling the user to register the phone number and the contract place in a phone number directory.

17. The apparatus of claim 9, wherein the selected supplementary service and any result from the selected supplementary service are received from a same packet data communication network.

18. The apparatus of claim 9, wherein the dispatcher executes the selected supplementary service in the form of plug and play.

19. The apparatus of claim 9, further comprising a network adaptor to provide communication of a TCP/IP or HTTP type required for executing the selected supplementary service.

20. The apparatus of claim 9, further comprising an event listener to inform the dispatcher of a reception of the short message.

21. The apparatus of claim 9, wherein the short message is stored in a short message service (SMS) message.

22. A short message processing method comprising:

parsing at least one word in a short message received from a mobile communication network and lexically analyzing the at least one word in the short message;

determining a type of the lexically analyzed at least one meaningful word from among a plurality of types and identifying a plurality of supplementary services corresponding to the type of the lexically analyzed at least one word; and executing one of the plurality of supplementary services based on a user's selection, wherein the lexically analyzed at least one meaningful word is at least one of a plurality of different types of meaningful words, wherein each meaningful word of the plurality of types corresponds to a different supplementary service, and wherein the plurality of supplementary services include a spam filtering service checking the existence of spam information in the short message and filtering the spam message from an originator, a schedule information registration service checking the existence of engaged schedule information in the short message and enabling the user to register the schedule information, and a credit card settlement details notifying service checking in the short message contents notifying of an upcoming payment of the credit card and notifying the user of the payment of the credit card.

23. A short message processing apparatus comprising:
a lexical analyzer for parsing at least one word in a short message received from a mobile communication network and for lexically analyzing the at least one word in the short message;
a controller for determining a type of the lexically analyzed at least one meaningful word from among a plurality of types and for identifying a plurality of supplementary services corresponding to the type of the lexically analyzed at least one word; and
a dispatcher for executing one of the plurality of supplementary services based on a user's selection,
wherein the lexically analyzed at least one meaningful word is at least one of a plurality of different types of meaningful words,
wherein each meaningful word of the plurality of types corresponds to a different supplementary service, and
wherein the plurality of supplementary services include a spam filtering service checking the existence of spam information in the short message and filtering the spam message from an originator, a schedule information registration service checking the existence of engaged schedule information in the short message and enabling the user to register the schedule information, and a credit card settlement details notifying service checking in the short message contents notifying of an upcoming payment of the credit card and notifying the user of the payment of the credit card.

24. A short message processing method in a mobile communication terminal, the method comprising:
parsing at least one meaningful word in a short message received from a mobile communication network and lexically analyzing the at least one meaningful word;
determining a type of the lexically analyzed at least one meaningful word from among a plurality of types and identifying a plurality of supplementary services corresponding to the type of the lexically analyzed at least one meaningful word;
displaying a confirmation message for selecting one of the plurality of supplementary services corresponding to the type of the lexically analyzed at least one meaningful word;
receiving a confirmation input to select one of the plurality of supplementary services from a user; and
driving an application in the mobile communication terminal the corresponding selected supplementary service,
wherein the lexically analyzed at least one meaningful word is at least one of a plurality of different types of meaningful words,
wherein each meaningful word of the plurality of types corresponds to a different supplementary service, and
wherein the plurality of supplementary services include a credit card settlement details notifying service checking in the short message contents notifying of an upcoming payment of the credit card and notifying the user of the payment of the credit card.

25. A short message processing apparatus in a mobile communication terminal, the apparatus comprising:
a lexical analyzer for parsing at least one meaningful word in a short message received from a mobile communication network and for lexically analyzing the at least one meaningful word;
a controller for determining a type of the lexically analyzed at least one meaningful word from among a plurality of types, for identifying a plurality of supplementary services corresponding to the type of the lexically analyzed at least one meaningful word, for controlling displaying of a confirmation message for selecting one of the plurality of supplementary services corresponding to the type of the lexically analyzed at least one meaningful word, and for receiving a confirmation input to select one of the plurality of supplementary services from a user; and
a dispatcher for driving an application in the mobile communication terminal the corresponding selected supplementary service,
wherein the lexically analyzed at least one meaningful word is at least one of a plurality of different types of meaningful words,
wherein each meaningful word of the plurality of types corresponds to a different supplementary service, and
wherein the plurality of supplementary services include a credit card settlement details notifying service checking in the short message contents notifying of an upcoming payment of the credit card and notifying the user of the payment of the credit card.

* * * * *